M. V. NOBLES.
Reversible Plumb and Square.
No. 41,344. Patented Jan. 19, 1864.
Fig. 1.
Fig. 2.
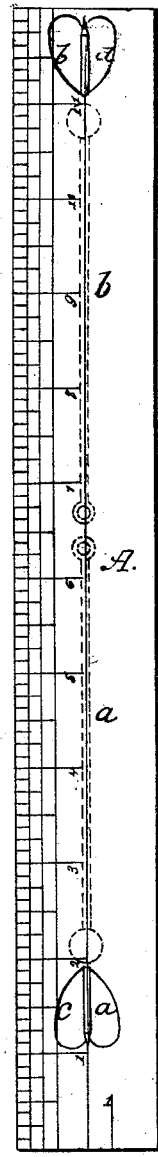
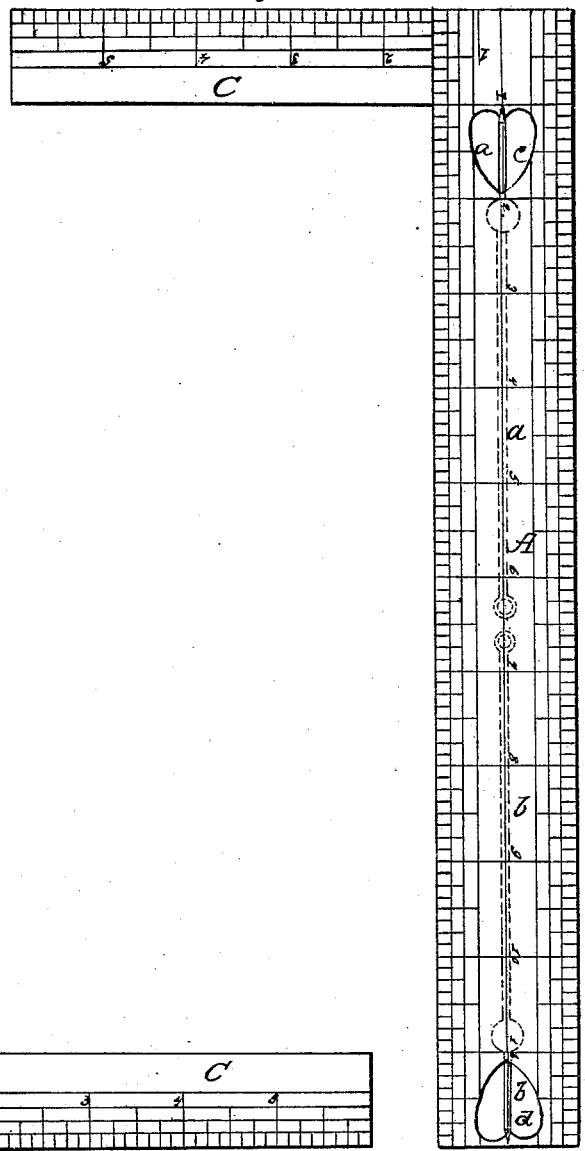
Witnesses
E. Evans Jr
J. D. Paton
Inventor
A. B. Stoughton
Atty for Milton V. Nobles

UNITED STATES PATENT OFFICE.

MILTON V. NOBLES, OF ST. ANTHONY'S FALLS, MINNESOTA, ASSIGNOR TO HIMSELF AND JOHN C. NOBLES.

IMPROVEMENT IN REVERSIBLE PLUMBS AND SQUARES.

Specification forming part of Letters Patent No. 41,344, dated January 19, 1864.

*To all whom it may concern:*

Be it known that I, MILTON V. NOBLES, of St. Anthony's Falls, in the county of Ramsey and State of Minnesota, have invented certain new and useful Improvements in a Reversible Plumb and Square; and I do hereby declare that the following is a full, clear, and exact description of the same, reference being had to the accompanying drawings, making a part of this specification, in which—

Figures 1 and 2 represent the combined plumb and square in reversed positions, in either of which the pendulum (one or the other) will indicate the plumb-line, whether the arm of the square be up or down.

I am aware that a plumb and level has long since been made in which two pendulums or weights were incased one to show the plumb line and the other the level-line, but this instrument lacked the properties of the square. I am also aware that a single pendulum or weighted rod has been hung in the body of a square, so as to make a plumb and square, but this instrument lacks one essential property—viz, that a line can only be plumbed from below upward with it or with the arm down.

My invention consists in combining two pendulums or weighted rods with a square, so that a plumb-line may be ascertained by it from above downward, as well as from below upward, or with either end of the square up or down, as shown in the drawings.

To enable others skilled in the art to make and use my invention, I will proceed to describe the same with reference to the drawings.

A represents the body of a square, and C the arm thereof, which body and arm may be marked off in any of the scales usual in such instruments. The body A is made hollow, or with a groove or grooves through it, in which are hung two pendulous or weighted rods, *a b*, as shown in red lines in the drawings. At each end (or near thereto) of the arm there are openings *c d* and indicating-points, to show a plumb, level, or square line, as the case may be.

It is immaterial which end of the square is upward, as one or the other of the pendulums or weighted rods will indicate a perpendicular line from the horizontal one against which the arm C may for the time being be placed.

If desired to indicate a level-line in addition to the plumb and square, one or two pendulums may be put in the arm C by making it also hollow or grooved, as in the body of the square A.

The instrument may be made of such size as may be deemed most suitable for its several purposes as plumb and square, the body and arm being capable of extension for several feet, if so required.

Having thus fully described the nature, object, and purpose of my invention, I would state that I do not claim the incasing of pendulums or weighted rods in a plumb and level, as this is not new; nor do I claim a single pendulum combined with the body of an ordinary square, as this is not new; but

What I do claim, and desire to secure by Letters Patent, is—

The arranging of two pendulums or weighted rods in the body of a square, indicating in opposite directions a plumb-line, so that the instrument may be used with the arm of the square up or down, as differing circumstances may require, and as set forth.

MILTON V. NOBLES.

Witnesses:
A. B. STOUGHTON,
HAVER FENDRICH.